US008384979B2

(12) United States Patent
Tsai

(10) Patent No.: US 8,384,979 B2
(45) Date of Patent: Feb. 26, 2013

(54) WRITING DEVICE INCLUDING DISPLAY PANEL AND STYLUS

(75) Inventor: Tai-Sheng Tsai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 182 days.

(21) Appl. No.: 12/884,216

(22) Filed: Sep. 17, 2010

(65) Prior Publication Data

US 2011/0075240 A1 Mar. 31, 2011

(30) Foreign Application Priority Data

Sep. 30, 2009 (CN) .......................... 2009 1 0308021

(51) Int. Cl.
*G02F 1/01* (2006.01)

(52) U.S. Cl. ........................................................ 359/242

(58) Field of Classification Search .......... 359/237–254; 345/45, 179, 180, 84; 349/24, 34, 69, 139, 349/182

See application file for complete search history.

(56) References Cited

U.S. PATENT DOCUMENTS 5,155,607 A * 10/1992 Inoue et al. ..................... 349/89
5,414,069 A * 5/1995 Cumming et al. ............ 528/310
6,917,391 B1 * 7/2005 Faris ............................... 349/12
2006/0290595 A1 * 12/2006 Takeuchi et al. ................ 345/55
2010/0039408 A1 * 2/2010 Cho et al. ...................... 345/175

* cited by examiner

*Primary Examiner* — Tuyen Tra

(74) *Attorney, Agent, or Firm* — Altis Law Group, Inc.

(57) ABSTRACT

A writing device includes a display panel, a stylus, a transparent first electrode layer and a second electrode layer. The display panel includes a displaying layer and a first light source. The displaying layer consists essentially of a photochromic material reversibly transformable between a first state of an electroluminescent material, and a second state of a non-electroluminescent material. The first light source is configured for emitting light to the displaying layer to transform the displaying layer into the second state. The stylus includes a second light source configured for emitting light to illuminate portions of the displaying layer, thus transforming the illuminated portions of the displaying layer into the first state. The first and second electrode layers attached on opposite sides of the displaying layer are configured to excite the illuminated portions of the displaying layer in the first state to emit light.

10 Claims, 3 Drawing Sheets

WRITING DEVICE INCLUDING DISPLAY PANEL AND STYLUS

BACKGROUND

1. Technical Field

The present disclosure relates generally to writing devices, in particular, a writing device which can be used repeatedly.

2. Description of Related Art

Currently, writing devices comprised of chalk and used on a blackboard are widely used by teachers and schools. The handwriting is always wiped off the chalkboard by hand and can cause considerable dust and debris to form in the classroom.

Another common writing device is a dry erase marker and a whiteboard. The ink of the pen and cleaning solvents usually include chemicals with adverse health effects to the users and other users who are exposed to them.

Therefore, there is room for improvement to provide a new writing device which can overcome the above mentioned problems.

BRIEF DESCRIPTION OF THE DRAWINGS

Many aspects of the present writing device can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
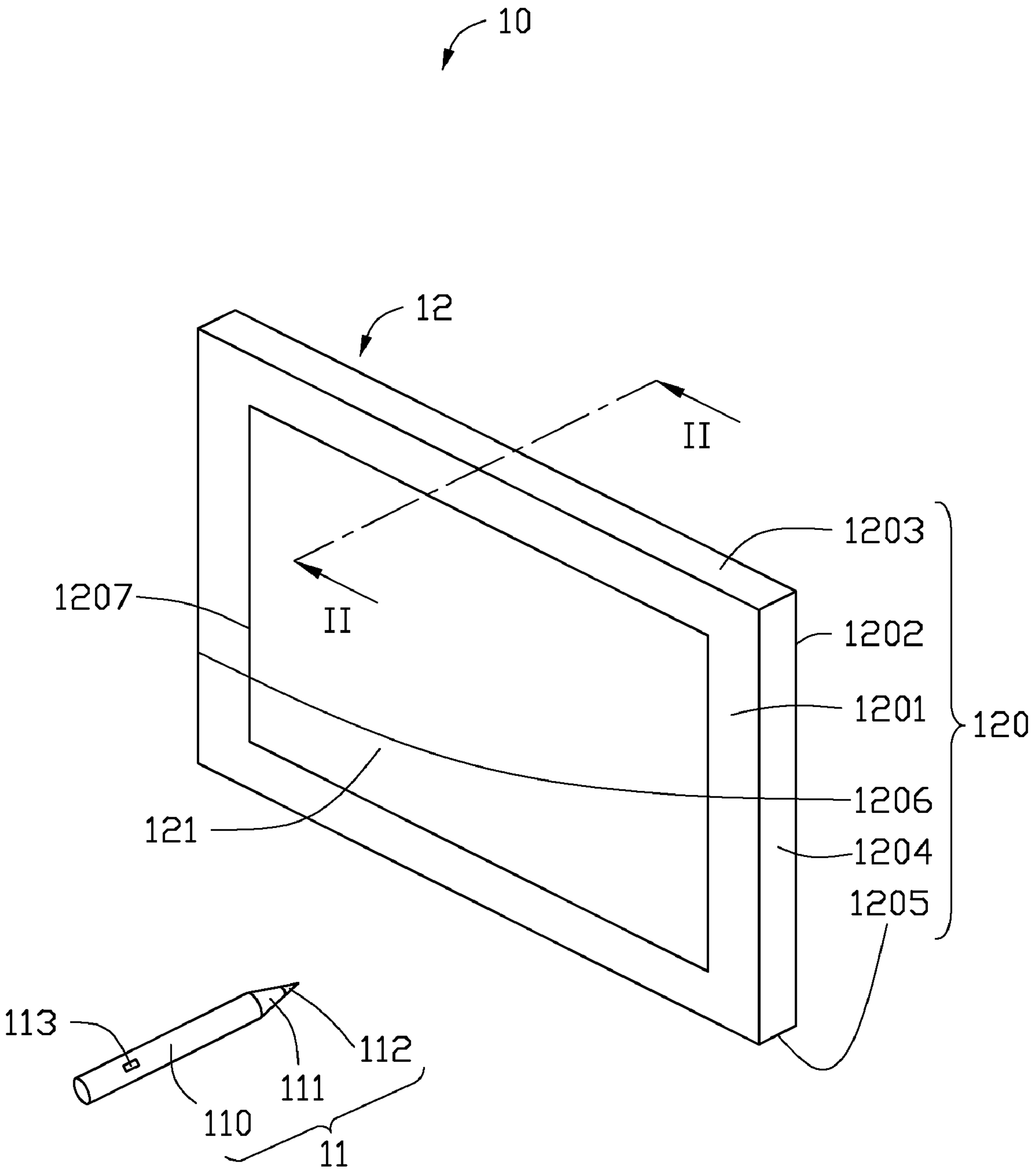
FIG. 1 is a schematic view of a writing device, which includes a display panel and a stylus, in accordance with an embodiment.
Figure 2:
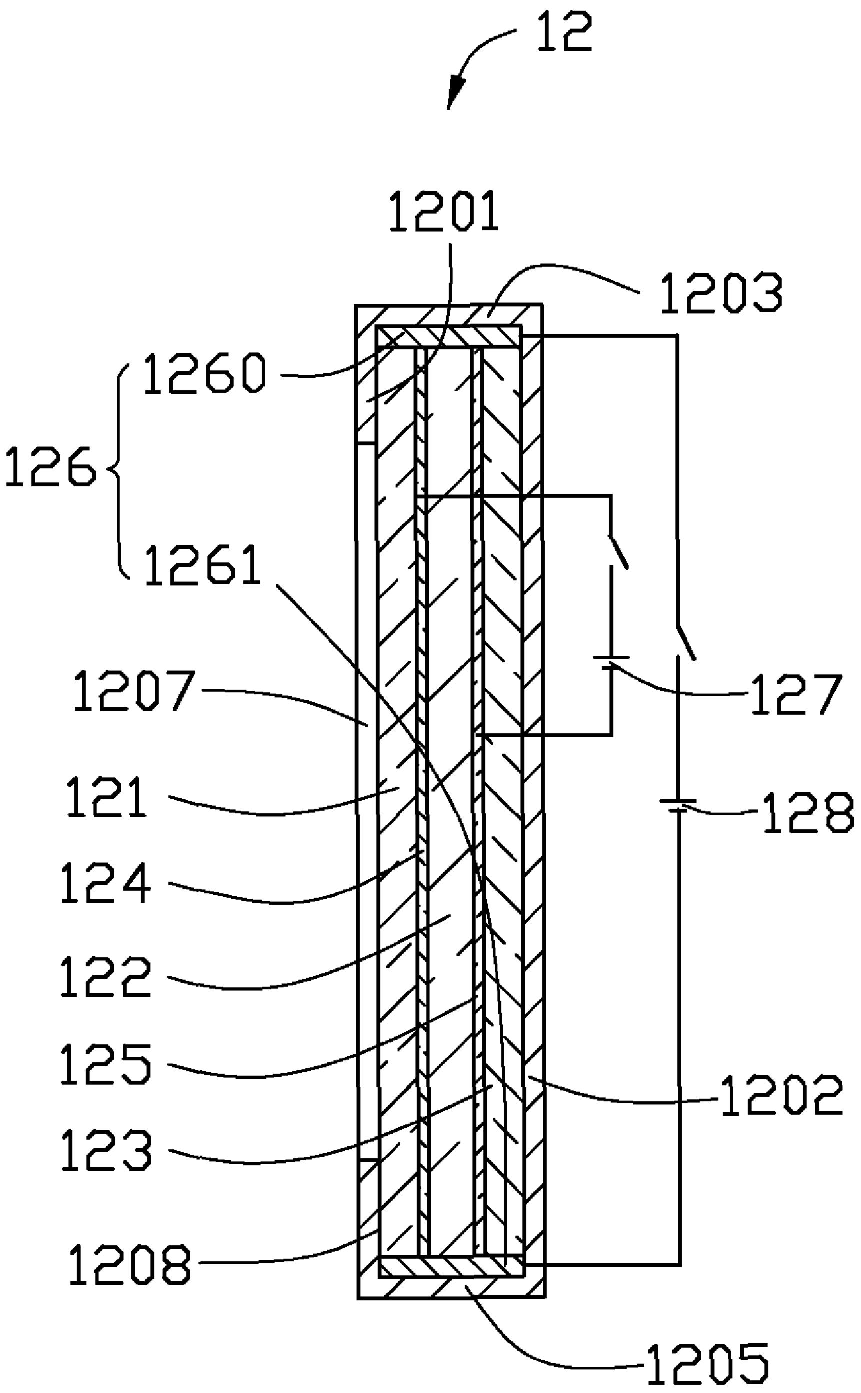
FIG. 2 is a sectional view of the display panel of the writing device, taken along line II-II of FIG. 1.

Referring to FIGS. 1 and 2, a writing device 10, in accordance with an embodiment, includes a stylus 11 and a display panel 12.

The stylus 11 includes a holding portion 110, a connecting portion 111, and a first light source 112. The holding portion 110 is configured for a user to hold the stylus 11. In the illustrated embodiment, the holding portion 110 is cylindrical in cross-section. The connecting portion 111 is positioned and connected between the holding portion 110 and the first light source 112. The first light source 112 is capable of emitting a light of a first wavelength in a range from 520 nanometers (nm) to 650 nm to illuminate the display panel 12. A switch 113 is electrically connected to the first light source 112 and is configured for switching the first light source 112 on and off. In the present embodiment, the switch 113 is mounted on the holding portion 110. A first power supply adapted for supplying power to the first light source 112 is embedded in the holding portion 110, and is electrically communicated with the switch 113. The first power supply can be a battery.

The display panel 12 is used for displaying a track corresponding to one that the first light source 112 has illuminated. The display panel 12 includes a receiving housing 120, a transparent first substrate 121, a displaying layer 122, a second substrate 123, a first electrode layer 124, a second electrode layer 125, and a second light source 126. The track used herein describes the motion of the stylus 11 related to the display panel 12.

The receiving housing 120 includes a front plate 1201, a back plate 1202, a first sidewall 1203, a second sidewall 1204, a third sidewall 1205, and a fourth sidewall 1206. The back plate 1202 is opposite to the front plate 1201. The first sidewall 1203, the second sidewall 1204, the third sidewall 1205, and the fourth sidewall 1206 are all connected between the front plate 1201 and the back plate 1202. The first sidewall 1203 is opposite to the third sidewall 1205, and the second sidewall 1204 is opposite to the fourth sidewall 1206. The front plate 1201, the back plate 1202, and the first through the fourth sidewalls 1203 through 1206 cooperatively define a receiving space 1208. The first substrate 121, the displaying layer 122, the second substrate 123, the first electrode layer 124, the second electrode layer 125, and the second light source 126 are all received in the receiving space 1208. An opening 1207 in communication with the receiving space 1208 is defined in a central portion of the front plate 1201.

The first substrate 121 is in contact with the front plate 1201 of the receiving housing 120, and a central portion of the first substrate 121 is exposed to the outside through the opening 1207. In the present embodiment, the receiving housing 120 is rectangular but not limited to being rectangular. In this embodiment, the second substrate 123 is in contact with the back plate 1202 of the receiving housing 120. The first substrate 121 and the second substrate 123 are configured for protecting the displaying layer 122 therebetween. In the present embodiment, the first substrate 121 and the second substrate 123 are all glass.

Figure 3:
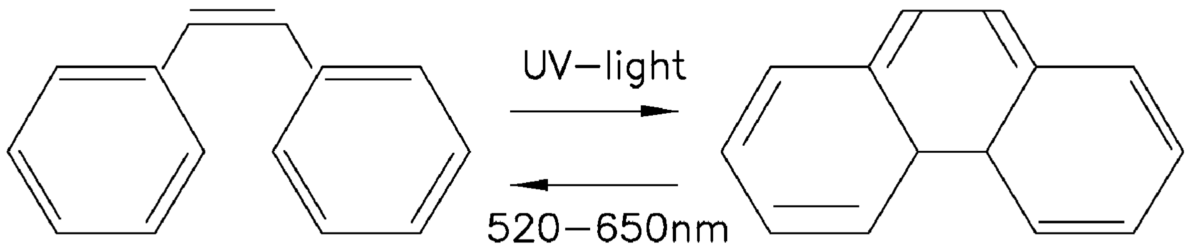
FIG. 3 is a chemical reaction of a displaying layer of the display panel of FIG. 1.

The displaying layer 122 consists essentially of a photochromic material reversibly transformable between a first state where the photochromic material is transformed into an electroluminescent material, and a second state where the photochromic material is transformed into a non-electroluminescent material. The portion of the displaying layer 122 that is illuminated by the first light source 112 is transformed from the second state into the first state. The portion of the displaying layer 122 in the first state can emit a light by an exciton of the first and second electrode layers, thus a writing track according to an illumination track of the first light source 112 is presented on displaying layer 122. The portion of the displaying layer 122 that is illuminated by the second light source 126 is transformed from the first state into the second state, thus no writing track is shown on the displaying layer 122. The displaying layer 122 can be formed by evaporation plating. The thickness of the displaying layer 122 is in a range of 180 nm to 220 nm. In the present embodiment, the displaying layer 122 is a diarylethene compound. The diarylethene compound is transformed into the second state under an illumination of an ultraviolet light, and is transformed into the first state to emit a fluorescent light under an illumination of a visible light of a wavelength from 520 nm to 650 nm. In the present embodiment, the displaying layer 122 is comprised of 1,2-diphenylethylene. Its chemical reaction is shown as FIG. 3.

Of course, the displaying layer 122 can also be other photochromic and electroluminescent material such as azobenzene, fulgide, spiropyran, or salicylidenedimine.

The first and second electrode layers 124,125 are attached on opposite sides of the displaying layer 122 and are configured to excite the illuminated portions of the displaying layer 122 in the first state to emit light. The first electrode layer 124 is transparent, and serves as an anode. The first electrode layer 124 is sandwiched between the first substrate 121 and the displaying layer 122. In the present embodiment, the first electrode layer 124 is transparent and electrically conductive material such as indium tin oxide (ITO), and is deposited on the first substrate 120 by sputtering. The second electrode layer 125 is sandwiched between the displaying layer 122 and the second substrate 123. The second electrode layer 125 serves as a cathode. The second electrode layer 125 is a metal or an alloy such as aluminum, aluminum-lithium alloy, and is deposited on the second substrate 123 by evaporation plating. In the present embodiment, the first electrode layer 124 and the second electrode layer 125 are all electrically communicated with a second power supply 127. That is, the first electrode layer 124 is electrically connected to an anode of the second power supply 127, and the second electrode layer 125 is electrically connected to a cathode of the same.

The second light source 126 is configured for emitting light of a second wavelength to the displaying layer 122 to transform the displaying layer 122 from the first state into the second state. In the present embodiment, the light emitted by the second light source 126 is an ultraviolet light. That is, the second wavelength is in a range from 4 nm to 380 nm. The second light source 126 includes a top light source 1260 and a bottom light source 1261 arranged on opposite sides of the displaying layer 122. In the present embodiment, the top light source 1260 is in contact with an inner surface of the first sidewall 1203 and a side surface of the displaying layer 122. The bottom light source 1261 is in contact with an inner surface of the third sidewall 1205 and another side surface of displaying layer 122. The top light source 1260 and the bottom light source 1261 are all connected with a third power supply 128, and controlled by the third power supply 128 to be turned on and off. When the top light source 1260 and the bottom light source 1261 emit light of a second wavelength to illuminate the displaying layer 122, the displaying layer 122 is transformed into the second state of a non-electroluminescent material, thus any writing track on the displaying layer 122 will disappear. It is noted that the second light source 126 can also be other suitable light source, such as a back-light module (not shown) capable of emitting light of a second wavelength.

The present writing device 10 can be used in the following steps. The first electrode layer 124 and the second electrode layer 125 provides an exciton to the displaying layer 122. Next, the second light source 126 is turned on, and the displaying layer 122 is transformed into the second state, thus no writing track is shown on the displaying layer 122. Next, the second light source 126 is turned off, the first light source 112 of the stylus 11 is turned on with the control switch 113. Then to write, the stylus 11 is moved by a user in a track. Accordingly, the first light source 112 illuminates the displaying layer 122 with that track. The portion of the displaying layer 122 illuminated by the first light source 112 is transformed from the second state into the first state and emit a fluorescent light by an exciton of the first and second electrode layers. Thus, an illumination track is shown on the displaying layer 122 responding to the track of the first light source 112.

In the presently illustrated writing device 10, the displaying layer 122 can display a writing track in correspondence to an illumination track of the first light source 112, and the writing track will disappear under an illumination of the second light source 126. It's not necessary to wipe the writing track by hand. The writing device 10 can be used time and again without any supplement of consumptive material.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

The invention claimed is:

1. A writing device comprising:

a stylus comprising a first light source operable for emitting light of a first wavelength;

a second light source operable for emitting light of a second wavelength;

a transparent first electrode layer;

a second electrode layer; and a displaying layer sandwiched between the first and second electrode layers, the displaying layer consisting essentially of a photochromic material reversibly transformable between a first state where a part of the photochromic material is an electroluminescent material when portions of the displaying layer is illuminated by the light emitted from the stylus and a voltage is applied between the first and second electrodes, and a second state where the part of the photochromic material is transformed into a non-electroluminescent material when the displaying layer is illuminated by the light emitted from the second light source and the voltage is applied between the first and second electrodes, thereby portions of the displaying layer illuminated by the light emitted from the stylus displaying an illuminated movement track of the stylus, wherein the photochromic material of the displaying layer consists essentially of 1,2-diphenylethylene, and the first wavelength in a range from 520 nm to 650 nm, the second wavelength is in a range from 4 nm to 380 nm.

2. The writing device of claim 1, wherein a thickness of the displaying layer is in a range from 180 nm to 220 nm.

3. The writing device of claim 1, further comprising a transparent first substrate and a second substrate, the first electrode layer is sandwiched between the first substrate and the displaying layer, the second electrode layer is sandwiched between the second substrate and the displaying layer.

4. The writing device of claim 3, further comprising a receiving housing which defines a receiving space therein, the second light source, the displaying layer, the first electrode layer, the second electrode layer, the first substrate and the second substrate are accommodated in the receiving space.

5. The writing device of claim 4, wherein the receiving housing defines an opening communicating with the receiving space, and a central portion of the first substrate is exposed to outside through the opening.

6. The writing device of claim 5, wherein the receiving housing further comprises a front plate and a back plate opposite to each other, the first substrate is in contact with the front plate, the second substrate is in contact with the back plate, the opening is defined in a central portion of the front plate.

7. The writing device of claim 3, wherein the second light source comprises a top light source and a bottom light source opposite to each other, the top and the bottom light sources are arranged on opposite sides of the displaying layer.

8. The writing device of claim 1, wherein the stylus comprises a switch electrically connected with the first light source.

9. The writing device of claim 1, further comprising a first power supply electrically connected with the first and the second electrode layers.

10. The writing device of claim 1, further comprising a second power supply electrically connected with the second light source.

* * * * *